United States Patent [19]

Petitclerc et al.

[11] Patent Number: 5,339,339
[45] Date of Patent: Aug. 16, 1994

[54] PROCESS FOR CARRYING OUT AN INSPECTION ROUND OF NUCLEAR INSTALLATIONS

[75] Inventors: Jean-Louis Petitclerc, Tourlaville; Jean-Louis Ricaud, Paris, both of France

[73] Assignee: COGEMA - Compagnie Generale des Matieres Nucleaires, Velizy Villacoublay, France

[21] Appl. No.: 125,493

[22] Filed: Sep. 22, 1993

Related U.S. Application Data

[63] Continuation of Ser. No. 855,454, Mar. 19, 1992, abandoned, which is a continuation of Ser. No. 621,791, Dec. 4, 1990, abandoned.

[30] Foreign Application Priority Data

Dec. 5, 1989 [FR] France ................. 89 16059

[51] Int. Cl.$^5$ ................................. G21C 17/00
[52] U.S. Cl. ...................... 376/245; 376/259; 340/306; 340/307
[58] Field of Search ............. 376/245, 259; 340/305, 340/306, 307, 308

[56] References Cited

U.S. PATENT DOCUMENTS

| | | | |
|---|---|---|---|
| 3,959,633 | 5/1976 | Lawrence et al. | 340/306 |
| 4,247,908 | 1/1981 | Lockhart, Jr. et al. | 364/900 |
| 4,296,408 | 10/1981 | Neuringer | 340/539 |
| 4,338,601 | 7/1982 | Nance-Kivell | 340/870.02 |
| 4,415,065 | 11/1983 | Sandstedt | 186/39 |
| 4,530,069 | 7/1985 | Desrochers | 364/900 |
| 4,601,011 | 7/1986 | Grynberg | 364/900 |
| 4,640,812 | 2/1987 | Sawyer | 376/245 |
| 4,857,883 | 8/1989 | Mama | 340/306 |

FOREIGN PATENT DOCUMENTS

| | | |
|---|---|---|
| 0157477 | 10/1985 | European Pat. Off. |
| 0209459 | 1/1987 | European Pat. Off. |
| 2161967 | 1/1986 | United Kingdom ............. 340/306 |

OTHER PUBLICATIONS

Petesen, R., "Hasler Personnel Protection Systems", Hasler Rev. vol. 14, No. 4, pp. 122–127, 1981.

*Primary Examiner*—Donald P. Walsh
*Assistant Examiner*—Chrisman D. Carroll

[57] ABSTRACT

Process for carrying out an inspection or monitoring round of a nuclear site (5) consisting of recording in a central computer (22) connected to a radiofrequency transmitter/receiver or transceiver (24) a combination or sequence of different collection or reading points (12) grouping sensors (10) constituting the round to be performed. This sequence is copied again into a memory of a portable microcomputer (26) carried by the watchman during the round and connected to a radiofrequency transceiver (28). Each connection point (12) is validated and this validation is transmitted to the central computer (22). The sensors are checked and any abnormal condition is indicated to the central computer (22). All the checks carried out are recorded in the portable microcomputer (26) and copied again at the end of the round into a central computer (22) in such a way that they can be processed.

9 Claims, 1 Drawing Sheet

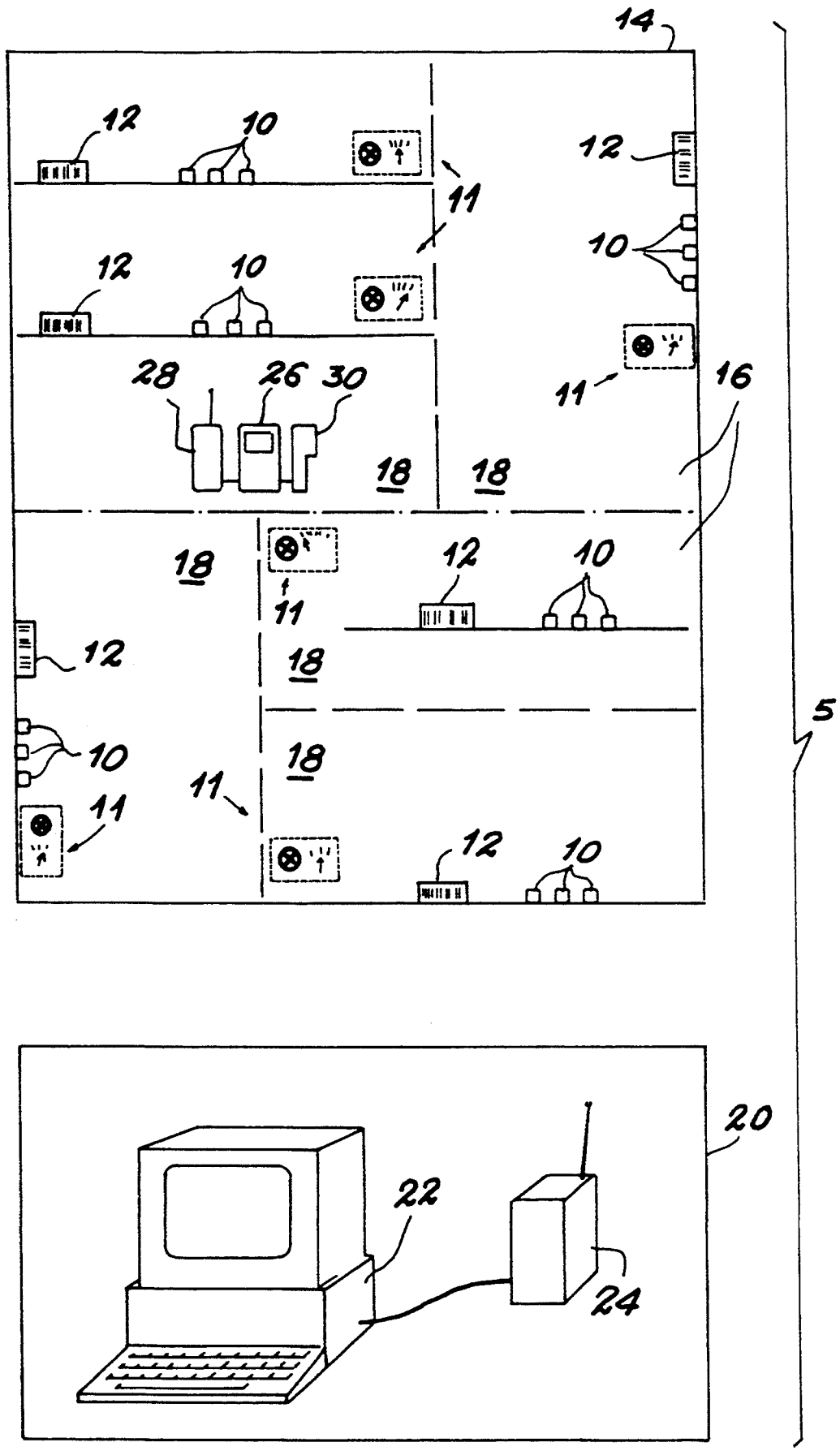

PROCESS FOR CARRYING OUT AN INSPECTION ROUND OF NUCLEAR INSTALLATIONS

This application is a continuation of application Ser. No. 07/855,454, filed Mar. 10, 1992, now abandoned, which is a continuation of application Ser. No. 07/621,791, filed Dec. 4, 1990, now abandoned.

BACKGROUND OF THE INVENTION

The present invention relates to a process for performing an inspection or monitoring round, applying more particularly to the systematic inspection of nuclear sites.

The automatic operation of certain nuclear installations requires regular monitoring or inspection. Following a predetermined path, a watchman performs a round during which he collects or reads data supplied by sensors positioned at different points of the installation. He checks and optionally modifies the functional state of equipment (e.g. opening or closing a valve, etc.). Access to certain areas of installations can be difficult and even dangerous and it is also appropriate to ensure the safety of the watchman. At the end of the round, the results of the measurements performed are generally stored and used for statistical processing or maintenance purposes.

French patent 2 585 145 discloses a process for monitoring an industrial installation. The person entrusted with the round identifies the sensors or equipments to be checked by reading a coded identification number attached to each sensor or equipment and automatically compares said identification number with a reference previously recorded in a reference or control system, the latter supplying at the end of the comparison a validation signal. The measurements performed during the round are recorded in the control system. This type of process removes responsibility from the operator and makes it possible to ensure the effective passage of the operator to the measuring points.

The measurements carried out during the round are at the earliest analyzed when the operator or watchman returns to the central control station. No decision concerning the operation of the industrial installation can be taken during the round. This time lag between the measurements and their analysis is prejudicial to the satisfactory operation of the installation. Any delay in consulting the results prevents rapid, effective maintenance actions.

SUMMARY OF THE INVENTION

The aim of the present invention is to provide a process for performing a round which is of a very flexible nature enabling preventative maintenance actions to be taken. A "dialogue" between a central monitoring unit and the watchman makes it possible to follow the path of the latter between the individual measuring points and thus to ensure that the round is being correctly performed. This also makes it possible to indicate in real time any abnormal condition noted during a measurement and to very rapidly take the necessary steps without waiting for the watchman to return. The watchman has more responsibility and he may decide to carry out supplementary measures or equipment function state changes not initially provided during the definition of the course of the round.

The watchman plays an active part in the process according to the invention. He is assisted in his decisions by a portable microprocessing means connected by a radio link to the central unit. On detecting an abnormal condition, he may decide to suspend his round in order to carry out the operations which he considers necessary, whilst keeping the central monitoring unit informed.

More specifically, the present invention relates to a process for performing a monitoring or inspection round of a nuclear site over which are distributed collection or reading points grouping at least one sensor and at least one equipment having a certain operating state, the round being performed by a watchman, characterized in that it comprises:
(a) beforehand
  (a) recording in a central computer connected to a radiofrequency transceiver,
    (i) a sequence or combination of collection points, sensors to be checked and equipments to be checked and/or whose operating state is to be modified, said sequence constituting the round,
    (ii) information including at least reference values, tolerance thresholds and assistance comments on the watchman's decision concerning the collection points, the sensors to be checked and the equipments to be checked and/or whose operating state is to be modified,
  (b) copying again the recording performed in (a) in a portable microcomputer connected to a radiofrequency transceiver,
(B) during the round,
  (a) one collection point for each passage,
    (i) performing a validation affirming passage to the collection point and for each validation a pinpointing signal of said collection point is transmitted by the transmitter connected to the portable microcomputer to the receiver connected to the central computer and recorded in the latter,
    (ii) checking the measuring points supplying information, recording said information in the portable microcomputer and comparing same with prerecorded information concerning the measuring points in such a way as to detect any abnormal state,
    (iii) checking and/or modifying the operating state of the equipment, recording information concerning said equipment and comparing the same with prerecorded information concerning said equipment so as to detect any abnormal state, any abnormal state detection in (ii) and
    (iii) leading to the transmission by the transmitter of the portable microcomputer to the receiver of the central computer,
(D) at the end of the round, the information recorded in the portable microcomputer is copied again into the central computer for processing.

The validation at each collection point confirms the passage of the watchman, so that, via the central computer, he can be followed throughout his round.

As a result of the "dialogue" between the computers enabling the watchman to maintain contact with the control room, any abnormal state is immediately passed onto the central computer and assistance or maintenance decisions can be taken in good time.

The transfer of the information collected during the round into the central computer makes it possible to obtain a historical account for the individual rounds of the different measures taken.

BRIEF DESCRIPTION OF THE DRAWING

The characteristics and advantages of the invention can be better gathered from the following explanatory, non-limitative description, with reference to the single drawing diagrammatically showing an industrial site, where monitoring and inspection rounds according to the invention are carried out.

DETAILED DESCRIPTION OF THE PREFERRED EMBODIMENTS

This industrial site 5 has not shown automatic installations, whose operation is checked by sensors 10 distributed over the site 5 and which are grouped around the collection or reading points 12. Equipments 11 having a certain operating state are also linked with these collection points and can be in the form of valves, switches, etc.

Each collection point 12 is pinpointed on the site 5 and indicated by a label carrying an identification bar code of the said point. In order to locate a collection point 12, the site 5 can e.g. be divided into levels, level 1 corresponding to a building 14, level 2 to part of the building designated as a cell 16, level 3 to part of the cell designated as a unit 18, whereby the latter can have several collection points 12.

In the drawing, the building 14 is subdivided into two cells 16 separated by a mixed line. The cells 16 are subdivided into units 18 by broken lines. The site 5 also has at least one control room 20 in which is installed at least one central computer 22 connected to a radiofrequency transceiver 24. The computer 22 can be of the microcomputer type.

Various data are contained in a general file kept up to date after each round. This file recorded in the central computer 22 contains all the collection points 12 to which are allocated the identification references permitting their location. The file also contains the list of sensors 10 and equipments 11 grouped around the collection points 12. These sensors 10 and equipments 11 are indicated by identification references. This list in the file is completed by various informations, e.g. the type of sensor (thermal, electric, sensitive to radiation, sensitive to fumes) or equipment (valve, switch, elevator), the geographical location, the normally expected characteristics or values, tolerance thresholds, the checks to be carried out on the data collected during the rounds, the values obtained during the different rounds already performed, the time and date of these readings, the measuring units used and any other information making it possible to carry out an effective inspection, such as e.g. assistance comments on the decision regarding each of the sensors and equipments.

Inter alia, this file makes it possible to display on a video monitor of a plan of the industrial site equipped with all the collection points, the sensors and equipments to be monitored.

Before starting on his round, the watchman chooses from within the central file a sequence of collection points 12, sensors 10 to be checked and equipments to be checked and/or whose operating state is to be modified. This sequence is recorded in the central computer 22 and is defined by the performance course of the round on the site 5. Recording also takes place of the informations (or part thereof, but at least the reference values, historical values corresponding e.g. to the last five readings, tolerance thresholds and assistance comments on the decision) concerning the collection points 12, the sensors 10 and the equipments 11 to be monitored.

Standard paths provided with information relating thereto are also available. They make it unnecessary for the watchman to redefine his complete path when starting out on each occasion. These standard paths can be modified at random.

When the sequence or combination has been established, a theoretical time necessary for the path between each collection point 12 is defined. This time is recorded in a memory of the central computer 22 for each path between two collection points 12.

Each round starts from the control room 20, where the watchman copies again the sequence established, as well as the informations relating thereto in a memory of a portable microcomputer 26 equipped with a screen associated with a radiofrequency transceiver 28. This microcomputer 26 is also equipped with a wand reader for reading a bar code 30.

On the basis of said data, the microcomputer 26 carried during the round guides the watchman by indicating to him towards which collection point 12 he should move, together with the equipments or sensors 10 to be checked.

At each passage to a collection point 12, the watchman reads the bar code carrying the identification reference of the point using the wand reader 30. This bar code reading constitutes a validation of the passage of the watchman to the collection point 12. The microcomputer 26 records the reading and allocates thereto a passage time table by means of an internal clock. Moreover, the microcomputer 26 displays on the screen a message confirming to the watchman that the collection point is indeed that provided in the sequence constituting the round. In the opposite case, the display on the screen of the portable microcomputer indicates the collection point normally provided. At this stage the operator has the choice between confirming the modification of the instruction provided by validating said information on the keyboard or of moving to the displayed collection point and carrying out again in situ an identification reading by reading the bar code.

At each reading of an identification reference of the collection point, a pinpointing or location signal is transmitted by the transmitter 28 connected to the portable microcomputer 26 to the receiver 24 connected to the central computer 22. The effect of the reception of the signal is to trigger an internal clock within the computer 22. If the following validation has not taken place when the theoretical time between two validations and which has been defined beforehand has elapsed, an alarm is given by the central computer 22. Initially said alarm can be a signal transmitted by the transmitter 24 associated with the central computer 22 to the receiver 28 associated with the portable microcomputer 26. This signal triggers a sound and/or visual transmission or the display of a message on the screen of the microcomputer 26. The watchman must then reply by a message which he enters into the microcomputer 26 and which is transmitted by radiofrequency transmission to the computer 22. If no response is received, the computer 22 can alert an emergency team, which will intervene as quickly as possible when the location of the watchman becomes known.

At each collection point 12, the watchman collects the informations supplied by the sensors 10 and records them in a memory of the portable microcomputer 26. He also carries out the checks and/or operating state changes of the equipments 11 and records information relating to said equipments.

For each sensor 10 or equipment 11, the microcomputer 26 makes a comparison between said informations and the prerecorded values corresponding to a normal operation of the installations. This comparison and also the definition of tolerance thresholds makes it possible to detect any operational abnormality.

Following each acquisition of informations concerning the sensors 10 or equipments 11, the watchman must carry out a validation. When the validated value is non-standard, via the transmitter 28, the microcomputer 26 transmits a message to the central computer 22. As a function of the defective sensor 10 and the type of abnormal condition, said central computer alerts a maintenance team, which can operate rapidly and effectively. Optionally, the central computer 22 can automatically interrupt certain electrical or other circuits.

When an abnormal operating state is detected, the watchman can display historical informations stored in the portable microcomputer 26 and which concern measurements performed during preceding rounds. The portable microcomputer 26 also displays assistance comments on the decision and, as a function of the particular case, the watchman can change the passage sequence to the collection points 12, check sensors 10 or equipments 11 not planned during the definition of the round, or even interrupt his round, whilst still keeping the central computer 22 informed via the radiofrequency link.

For each checked sensor 10 or equipment 11, the watchman is responsible for recording comments on the operation of the installations. These comments favour an effective preventative maintenance, because they make it possible to avert incidents. For example, a maintenance team alerted by these comments can replace a particular part before it deteriorates and in fact as soon as it has deficiency symptoms.

At the end of he round, the informations read on the sensors 10 and contained in a memory of the portable microcomputer 26 are recorded in a memory of the central computer 22 in such a way that they can be processed there, whilst the central file is also updated. The processing can consist of statistics concerning a large number of rounds, evolutions of informations supplied by the sensors, or an analysis of variations in the reaadings of the sensors. If desired, a written paper report of all the informations can be obtained.

The process according to the invention makes it possible to follow several watchmen from the same control room. The permanent link between the central computer and the portable microcomputer enables decisions to be taken rapidly and effectively. As a result of this link and the informations contained in the portable microcomputer, the watchman can analyze abnormal situations and act as a consequence thereof. He is responsible for his actions, whilst still being controlled by the central computer.

We claim:

1. Process for performing a monitoring or inspection round of a nuclear site over which are distributed collection or reading points carrying an identification on the said points indicated by labels, sensors and equipments, at least one sensor and at least one equipment having a certain operating state being grouped around a collection point, the round being performed by a watchman, carrying a portable microcomputer equipped with a screen associated with a radiofrequency transceiver and a wand reader for reading labels characterized in that it comprises:

(A) beforehand
  (a) recording in a central computer connected to a radiofrequency transceiver,
    (i) a sequence or combination of collection points, sensors to be checked and equipments to be checked and/or whose operating state is to be modified, said sequence constituting the round,
    (ii) information including at least reference values, tolerance thresholds and assistance comments on the watchman's decision concerning the collection points, the sensors to be checked and the equipments to be checked and/or whose operating state is to be modified,
  (b) copying again the recording performed in (a) in the portable microcomputer,
(B) during the round, at each passage to a collection point the watchman reads the label carrying the identification reference of the point using the wand reader;
  (a) performing a validation affirming passage to the collection point and for each validation a pinpointing signal of said collection point is transmitted by the transmitter connected to the portable microcomputer to the receiver connected to the central computer and recorded in the latter,
  (b) checking the sensors supplying information, recording said information in the portable microcomputer and comparing same with prerecorded information concerning said sensors in such a way as to detect any abnormal state,
  (c) checking and/or modifying the operating state of the equipment, recording information concerning said equipment and comparing the same with prerecorded information concerning said equipment so as to detect any abnormal state,
  (d) said portable microcomputer providing to the watchman an immediate comparison at an installation site between measured information and prerecorded values corresponding to a normal operation of the installations, historical information of the measurements performed during preceding rounds and assistance comments as a function of the comparison made by the microcomputer thereby providing an immediate diagnosis for the watchman to analyze abnormal situations of said installation site and act on the process as a result thereof, any abnaormal state detection in (b) and (c) leading to the transmission by the transmitter of the portable microcomputer to the receiver of the central computer, the watchman being able then to change the passage sequence of the collection points, sensors or equipments not planned during the definition of the round or even interrupt his round,
(C) at the end of the round, the information recorded in the portable microcomputer is coped again into the central computer for processing.

2. Process according to claim 1, characterized in that, following stages (B) (b) or (B) (c), the sequence of collection points (12), sensors (10) and equipments (11) is optionally modified, a radiofrequency transmission from the portable microcomputer (26) to the receiver of the central computer (22) informing the central computer (22) of changes.

3. Process according to claim 1, characterized in that, following stages (B) (b) or (B) (c), the round is interrupted, a radiofrequency transmission from the portable microcomputer (26) to the receiver of the central computer (22) informing the latter of the interruption.

4. Process according to claim 3, characterized in that, following an interruption, the round is optionally resumed from any random collection point (12).

5. Process according to claim 1, characterized in that the validation of a collection point (12) consists of reading a bar code associated with the collection point (12).

6. Process according to claim 1, characterized in that a file of collection points (12) and their location on the site (5) also containing a list of sensors (10) and equipments (11) grouped at each collection point (12) is recorded in the central computer (22).

7. Process according to claim 6, characterized in that the sequence constituting the round is determined on the basis of said file.

8. Process according to claim 1, characterized in that the sequence constituting the round is chosen from among a list of previously established sequences recorded in the central computer (22).

9. Process according to claim 1, characterized in that a theoretical time necessary to the path between each collection point (12) is recorded in the central computer (22) and, during the round, following each individual a clock is triggered by the central computer (22) and if the following validation has not taken place when the theoretical time has elapsed, an alarm is triggered by the central computer (22).

* * * * *